US006401248B1

United States Patent
Christensen

(10) Patent No.: US 6,401,248 B1
(45) Date of Patent: Jun. 11, 2002

(54) TRAVEL BLANKET WITH OPEN BACK HOOD

(76) Inventor: Barbara L. Christensen, 7044 Pike Ct., Arvada, CO (US) 80007

( * ) Notice: Subject to any disclaimer, the term of this patent is extended or adjusted under 35 U.S.C. 154(b) by 0 days.

(21) Appl. No.: 09/793,781

(22) Filed: Feb. 27, 2001

(51) Int. Cl.⁷ ................................................ A41D 3/08
(52) U.S. Cl. .................................................. 2/69; 2/80
(58) Field of Search .............................. 2/69, 69.5, 80, 2/83, 88, 84, 85, 93, 94; 5/494, 413 R, 655, 923, 603, 94, 482; 297/184.13, 217.1, 250.1, 219.12, 464, 465, 485

(56) References Cited

U.S. PATENT DOCUMENTS

| | | | | |
|---|---|---|---|---|
| D204,225 S | * | 4/1966 | Klein | 2/88 |
| 4,856,113 A | * | 8/1989 | Moscatelli | 2/84 |
| 5,168,579 A | * | 12/1992 | Marshall | 2/88 |
| 5,437,061 A | * | 8/1995 | Kenner | 2/69 |
| 5,956,766 A | * | 9/1999 | Benway | 2/69 |
| 6,036,260 A | * | 3/2000 | Mullen | 297/184.13 |
| 6,055,686 A | * | 5/2000 | Knight | 5/494 |

* cited by examiner

*Primary Examiner*—Gloria M. Hale
(74) *Attorney, Agent, or Firm*—Edwin H. Crabtree; Ramon L. Pizarro; Donald W. Margolis

(57) ABSTRACT

A travel blanket with open back hood used for quickly covering a child already strapped into a car seat, a stroller and other child carriers. The travel blanket is designed to eliminate the need of covering the child prior to strapping the child into the seat. The baby blanket includes a front cover. The front cover includes opposite sides, a top portion with a "V" shaped opening and a bottom portion. Attached to the top of the top portion of the front cover is a hood. The hood includes opposite sides, a top portion, a front opening and a back opening. The back opening of the hood is designed to receive the child's head therethrough when the blanket is received on the child, The top portion of the front cover includes a zipper along opposite sides of the "V" shaped opening. The zipper is used for opening the "V" shaped opening when placing the hood over and around the head of the child. Also using the sipper, the "V" shaped opening can be closed for added warmth to the child covered by the travel blanket.

20 Claims, 1 Drawing Sheet

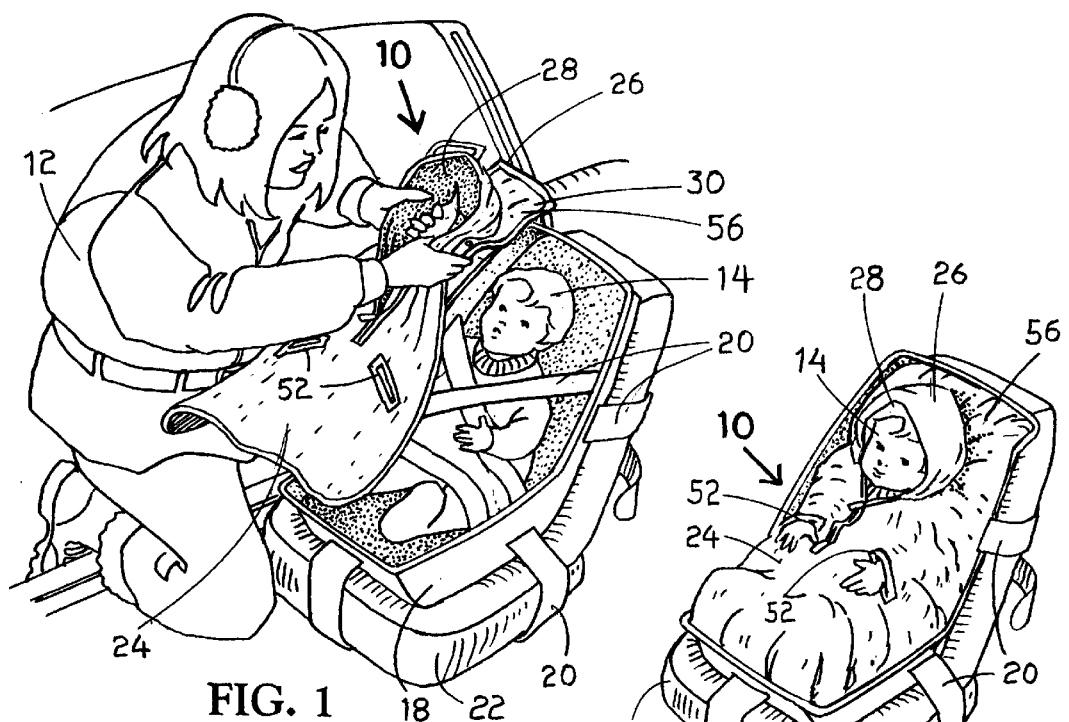
FIG. 1
FIG. 2
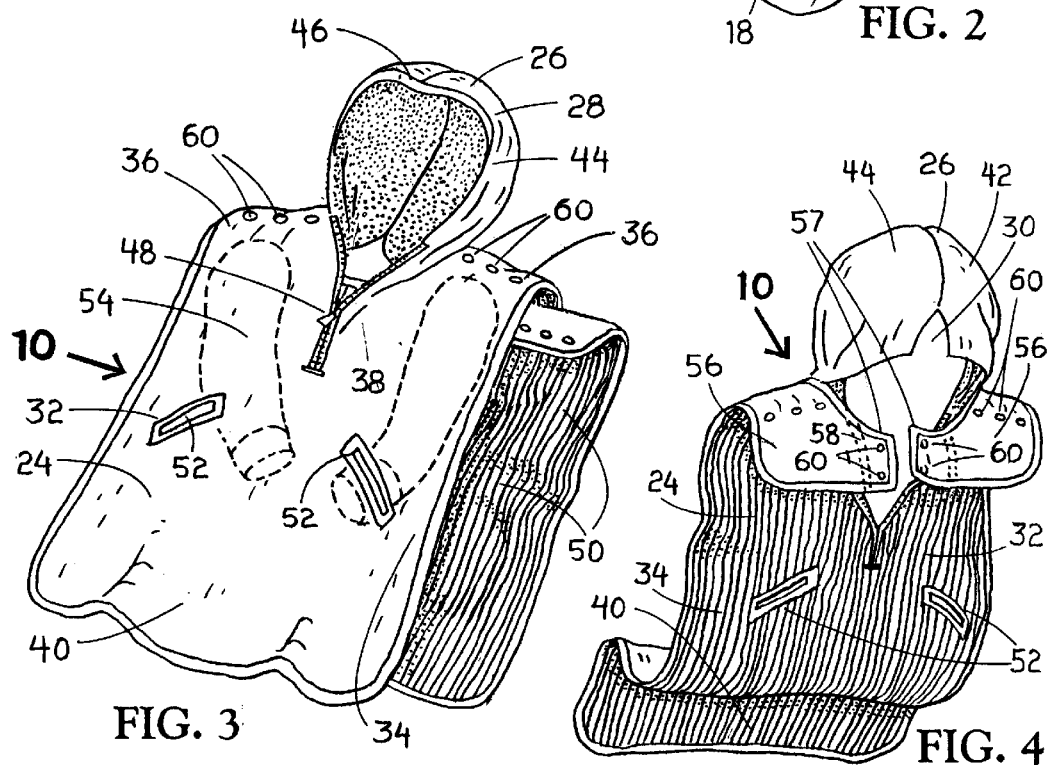
FIG. 3
FIG. 4

TRAVEL BLANKET WITH OPEN BACK HOOD

BACKGROUND OF THE INVENTION (a) Field of the Invention

This invention relates to travel blankets and more particularly, but not by way of limitation, to a travel blanket for covering a child in a car seat or car seat carrier.

(b) Discussion of Prior Art

In U.S. Pat. Nos. 5,950,261 to Hay et al. and 5,611,095 to Schneider, two different types of baby wraps are disclosed for receipt on a child in a child's car seat. Also, U.S. Pat. Nos. 4,946,221 to Livingston, 6,056,355 to Klassen and 6,019,421 to Roh disclose different types of infant car seat covers and a protective cover for a child in a car seat.

Further, U.S. Pat. No. 5,437,061 to Kenner and U.S. Pat. No. 5,168,579 to Marshall describe a protective garment-type cover received over a child riding in a carriage and a weather protective garment for an infant riding in a stroller. Still further, U.S. Pat. Nos. 5,956,767 to Imm and 5,535,449 to Dickey illustrate an infant cover-up for a car seat and a outer wrap for covering the front and back of a child.

None of the above mentioned patents disclose the unique combination of features, advantages, objects, structure and function of the subject travel blanket with open back hood as described herein.

SUMMARY OF THE INVENTION

In view of the foregoing, it is a primary object of the subject invention to provide a travel blanket with open back hood which can be used to quickly cover and uncover a child even when the child is a sleep. The travel blanket is designed for use when the child is already strapped into a car seat, a stroller and other child carriers, The blanket goes over the top of the straps and buckles of the car seat.

Another object of the invention, is the travel blanket is designed to eliminate the need of covering the child prior to strapping the child into the seat. This feature eliminates dressing the child in cold weather in cumbersome clothing that is awkward and unsafe to strap into a car seat and the hassle to take the cumbersome clothing on-and-off every time the child is carried in and out of a vehicle or building.

Still another object of the invention is the travel blanket is used to provide warmth to the child in the car seat by covering his or her front, sides, head and shoulders. Also, the blanket can be quickly removed as the temperature increases in the vehicle or the weather outside increases in temperature. Further, the blanket can be quickly removed when the child is carried in a car seat carrier or stroller into a store, home, etc.

Yet another object of the travel blanket is the hood of the blanket helps keep the blanket resting on top of the child where a normal blanket can be kicked off by an active child in a car seat or car seat carrier.

The baby blanket includes a front cover. The front cover includes opposite sides, a top portion with a "V" shaped opening and a bottom portion. Attached to the top of the top portion of the front cover is a hood. The hood includes opposite sides, a top portion, a front opening and a back opening. The back opening of the hood is designed to receive the child's head therethrough when the blanket is received on the child. The top portion of the front cover includes a zipper or like fastener along opposite sides of the "V" shaped opening. The zipper is used for opening the "V" shaped opening when placing the hood over and around the head of the child. Also using the zipper, the "V" shaped opening can be closed for added warmth to the child covered by the travel blanket.

These and other objects of the present invention will become apparent to those familiar with the different types of travel blankets and coverings for children in car seats, strollers and other children carrying devices when reviewing the following detailed description, showing novel construction, combination, and elements as herein described, and more particularly defined by the claims, it being understood that changes in the embodiments to the herein disclosed invention are Meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which:

FIG. 1 is a perspective view of the subject invention being held by a mother and positioned for receipt over the head and in front of a child strapped into a car seat attached to a vehicle seat.

FIG. 2 is another perspective view of the travel blanket received around the child's head and over the front and sides of the child resting in the car seat and ready for travel during cold weather.

FIG. 3 is a front perspective view of the subject invention and illustrating another embodiment of the blanket having a removable rear cover. The rear cover can be attached to the top of a front cover of the blanket for providing additional warmth.

FIG. 4 is a rear perspective view of the travel blanket showing an open back hood attached to a top of a top portion of a front cover of the travel blanket. Also a "U" shaped shoulder cover is shown attached to the top portion of the front cover.

DESCRIPTION OF THE PREFERRED EMBODIMENTS

In FIG. 1, a perspective view of the subject travel blanket is illustrated and having general reference numeral 10. The blanket is shown being held by a mother 12 and positioned for receipt over a head 14 of a child 16 strapped in a car seat 18 with car seat straps 20. While the car seat 18 is shown in the drawings, the blanket 10 can be used equally well with a car seat carrier, stroller and other devices used for carrying a child. The car seat 18 is shown secured to the top of a vehicle seat 22. Broadly the travel blanket 10 includes a front cover 24 and hood 26 with a front opening 28 and a back opening 30.

In FIG. 2, another perspective view of the travel blanket 10 is shown with the hood 26 received around the child's head 14. Also, the front cover 24 is shown covering the front and sides of the child 16 resting in the car seat 18.

In FIG. 3, a front perspective view of the subject travel blanket 10 is illustrated. In this view, the front cover 24 includes opposite sides 32 and 34, a top portion 36 with a "V" shaped opening 38 and a bottom portion 40. Attached to the top of the top portion 36 of the front cover 24 is the hood 26. The hood 26 includes opposite sides 42 and 44, a top portion 46, the front opening 28 and the back opening 30. The back opening 30 of the hood 26 is designed to receive the child's head 14 therethrough when the blanket 10 is received on the child 16. Obviously, the feature of the back opening 30 of the hood 26 allows the mother 12 to quickly cover the child 16 with the blanket 10 and just as quickly remove the blanket 10 from around the child 16.

The top portion 36 of the front cover 24 includes a zipper 48 along opposite sides of the "V" shaped opening 38. The zipper 48 is used for opening the "V" shaped opening 38 when placing the hood 26 over and around the head 14 of the child 16. Also using the zipper 48, the "V" shaped opening 38 can be closed for added warmth to the child 16 covered by the travel blanket 10. While the zipper 48 is shown in the) drawings, it can be appreciated that various types of clothing fasteners, such as snaps, buttons, hook and loop fasteners and the like, can be used equally well without departing from the spirit and scope of the invention. Further, the "V" shaped opening 38 can be used without any fasteners.

The blanket 10 may also include a removable rear cover 50, which can be releasable attached to the top of the top portion 36 of the front cover 24 of the blanket 10 using snaps 52 or like fasteners. The removable rear cover 50 provides another embodiment of the travel blanket 10 should the mother 12 wish to cover the back of the child 16 when the child is taken out of the car seat 18. Also, the rear cover 50 can be moved to the front of the blanket 10 and strapped to the top of the top portion 36 of the front cover 24. This feature provides for a double layer of warmth in front of the child.

Also shown in dashed lines in this drawing are a pair of sleeves 54 attached to a portion of the top of the sides 32 and 34 of the front cover 24. It should be mentioned that the above described travel blanket 10 is typically used with children in an age range of 3 month to 4 years. For older and more active children, the sleeves 54 can be used for covering the child's arms when riding in the car seat 18. The front cover 24 further includes a pair of hand openings 52 which allow the child 16 to extend this hands therethrough as shown in FIG. 2.

In FIG. 4, a rear perspective view of the travel blanket 10 is shown. In this drawing, a shoulder cover 56 is shown integrally attached to the top portion 36 of the front cover 24. The shoulder cover 56 can be a single piece unit having a "U" shaped opening 57. The "U" shaped opening providing additional room with receiving the blanket 10 and hoods 26 over the top of the child's head 16. Also, the shoulder cover 56 can be divided into a two piece shoulder cover, for ease in quickly placing the cover around the shoulders of the child. The two piece shoulder cover 56 can be cut and stitched along dashed lines 58. Further, the shoulder cover 56 can be divided in the middle into another two piece shoulder cover, as shown in this drawing, with opposite ends of the two piece shoulder cover secured together using snaps 60 or like fasteners.

When the hood 26 is received over the child's head 14, the mother 12 can fold the shoulder cover 56 with opening 57 upwardly and the head received through the "V" shaped opening 38 in the front cover 24. Also, the shoulder cover 56 can be opened, using the snaps 60 and the child's head 14 received through both the back opening 30 of the hood 26 and the "V" shaped opening 38 in the front cover. Further, the shoulder cover 56 can be folded against a portion of the top portion 36 of the front cover 24 and the child's head inserted through the back opening 30 of the hood 26 and the "V" shaped opening 38 in the front cover 24.

Once the hood 26 is received around the head 14, the shoulder cover 56 is placed next to the sides of the hood 26 and on top of the car seat 18, as shown in FIG. 2. Also, the hood 26, if not needed can be folded forward toward the "V" shaped opening 38 off of the child's head 14.

While the invention has been shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

What is claimed is:

1. A travel blanket used for quickly covering the front of a child and a child's head, the child already strapped into a car seat, a car seat carrier, a stroller and other child carriers, the travel blanket comprising:

a front cover, said front cover having opposite sides, a top portion and a bottom portion; and a hood attached to the top portion of said front cover, said hood having opposite sides, a top portion, a front opening and a back opening, the back opening of said hood adapted for receiving the child's head therethrough when the travel blanket is received on the child.

2. The travel blanket as described in claim 1 wherein the top portion of said front cover includes a "V" shaped opening therein.

3. The travel blanket as described in claim 2 further including attachment means disposed on opposite sides of said "V" shaped opening, said attachment means for opening the "V" shaped opening when placing said hood over the head of the child.

4. The travel blanket as described in claim 1 further including a one piece shoulder cover integrally attached to a top of the top portion of said first front cover, said shoulder cover adapted for covering the shoulders of the child in the car seat.

5. The travel blanket as described in claim 4 wherein said shoulder cover has a "U" shaped opening in a portion thereof, said "U" shaped opening providing additional room when said shoulder cover is received around the child's head.

6. The travel blanket as described in claim 4 wherein said shoulder cover is divided in the middle forming a two piece unit for ease in receipt around the child.

7. The travel blanket as described in claim 1 further including a rear cover removably attached to the top portion of said front cover and extending downwardly therefrom.

8. The travel blanket as described in claim 1 further including a rear cover removably attached to the top portion of said front cover, said rear cover attached to the front of the top portion of said front cover for forming a double layer of the blanket.

9. A travel blanket used for quickly covering the front of a child and a child's head, the child already strapped into a car seat, a stroller and other child carriers, the travel blanket comprising:

a front cover, said front cover having opposite sides, a top portion and a bottom portion;

a hood attached to the top portion of said front cover and centered thereon, said hood having opposite sides, a top portion, a front opening and a back opening, the back opening of said hood adapted for receiving the child's head therethrough when the travel blanket is received on the child; and a "V" shaped opening disposed in a center of the top portion of said front cover therein.

10. The travel blanket as described in claim 9 further including attachment means disposed on opposite sides of said "V" shaped opening, said attachment means for opening and closing the "V" shaped opening.

11. The travel blanket as described in claim 9 further including a shoulder cover integrally attached to the top portion of said first front cover and extending downwardly therefrom, said shoulder cover adapted for covering the shoulders of the child resting in the car seat.

12. The travel blanket as described in claim 11 wherein said shoulder cover is divided in the middle forming a two piece unit for ease in receipt around the child, said two piece shoulder cover having opposite ends releasably attached to each other.

13. The travel blanket as described in claim 9 further including a rear cover removably attached to the top portion of said front cover and extending downwardly therefrom.

14. The travel blanket as described in claim 13 wherein said rear cover is removably attached the top portion of said front cover and disposed on top of said front cover from providing a double layer of cover in the front of the child.

15. A travel blanket used for quickly covering the front of a child and a child's head, the child already strapped into a car seat, a stroller and other child carriers, the travel blanket designed to eliminate the need of covering the child prior to strapping the child into the seat, the travel blanket comprising:

a front cover, said front cover having opposite sides, a top portion and a bottom portion;

a hood attached to the top portion of said front cover and centered thereon, staid hood having opposite sides, a top portion, a front opening and a back opening, the back opening of said hood adapted for receiving the child's head therethrough when the travel blanket is received on the child;

a "V" shaped opening disposed in a center of the top portion of said front cover therein;

attachment means disposed on opposite sides of said "V" shaped opening, said attachment means for opening said "V" shaped opening when receiving said hood over the child's head; and a rear cover removably attached to the top portion of said front cover.

16. The travel blanket as described in claim 15 further including a shoulder cover with a "U" shaped opening formed in a top portion thereof, said shoulder cover integrally attached to the top portion of said first front cover and extending downwardly therefrom, said shoulder cover adapted for covering the shoulders of the child in the car seat.

17. The travel blanket as described in claim 16 wherein said shoulder cover is divided into a two piece unit with a space therebetween, said two piece shoulder cover for ease in receipt around the child.

18. The travel blanket as described in claim 16 wherein said shoulder cover is divided in the middle forming a two piece unit for ease in receipt around the child, said two piece shoulder cover having opposite ends, the opposite ends having attachment means for releasably attaching the opposite ends together.

19. The travel blanket as described in claim 15 wherein said rear cover is removably attached to the top portion of said front cover, said rear cover extending downwardly from the top portion of said front cover.

20. The travel blanket as described in claim 15 wherein said rear cover is removably attached the top portion of said front cover and disposed on top of said front cover from providing a double layer of cover in the front of the child.

* * * * *